United States Patent [19]

Larsen

[11] 4,044,785

[45] Aug. 30, 1977

[54] COMBINED, ADJUSTABLE AIRING VALVE AND FIRE PROTECTION VALVE

[76] Inventor: Ole Arvid Larsen, Michelets vei 38C, Oslo 10, Norway

[21] Appl. No.: 651,348

[22] Filed: Jan. 22, 1976

[30] Foreign Application Priority Data

Jan. 31, 1975 Norway ................................ 750302

[51] Int. Cl.[2] ................................ F16K 17/38

[52] U.S. Cl. ................................ 137/75; 98/1

[58] Field of Search ............... 98/1, 41 R, 41 AV, 86; 137/72-77; 169/57

[56] References Cited

U.S. PATENT DOCUMENTS

| | | | |
|---|---|---|---|
| 800,740 | 10/1905 | Hoelder et al. | 137/75 |
| 2,640,491 | 6/1953 | MacBain | 137/75 |
| 2,817,349 | 12/1957 | Seaver | 137/75 |
| 3,495,606 | 2/1970 | Phillips | 98/86 X |

FOREIGN PATENT DOCUMENTS

| | | | |
|---|---|---|---|
| 204,381 | 5/1966 | Sweden | 137/75 |

*Primary Examiner*—Martin P. Schwadron
*Assistant Examiner*—Richard Gerard
*Attorney, Agent, or Firm*—Holman & Stern

[57] ABSTRACT

A combined airing valve and fire protection valve comprising an adjustable valve head and a fusible element which is easily influenced by heat so as automatically to induce closing of the valve when fire or overheating occurs. In order to avoid maladjustment of the valve head and possible consequent destruction of the fusible element, the fusible element which takes the form of a fusible nut, is disposed on a valve stem of the valve head so as to follow the valve head if the latter is inadvertently rotated by unauthorized persons.

3 Claims, 6 Drawing Figures

COMBINED, ADJUSTABLE AIRING VALVE AND FIRE PROTECTION VALVE

BACKGROUND OF THE INVENTION

The present invention relates to a combined, adjustable airing valve and fire protection valve comprising a valve head commensurate with a valve seat, a valve stem taking the form of an adjusting screw, a fusible element taking the form of a nut threaded on the valve stem, a support bracket supporting and guiding the valve stem and a biasing means arranged between the support bracket and the stop plate on the valve stem.

In the present case a fire protection valve means a valve which as known per se is provided with a fuse element which is easily influenced by heat so that the valve will automatically close when fire or overheating occurs.

From Swedish patent specification No. 204 381 there is known an airing valve having a valve head which is held in open position by means of a temperature sensitive element, e.g. a disc consisting of a fusion metal. This disc-shaped element is clamped between a lock nut and a spring-tensioned gliding piece, the lock nut abutting against a sliding sleeve so as during normal conditions to prevent the lock nut from being pulled into the sleeve. However, such a fusible arrangement is severely subjected to destruction during the calibration of the valve head, as the disc-shaped fusible element which is manufactured from a rather soft metal, is cut to pieces when the lock nut is tightened.

Due to the soft metal of the fuse disc a proper locking of the valve head in the calibrated position is difficult to obtain. This fact also entails that an unauthorized person may turn the valve head and thereby alter the original airing characteristic of the valve.

Finally, re-adjustment of the valve will be very difficult because the soft material of the fusible element will stick to the lock nut. Usually, loosening of the lock nut will, therefore, entail a cutting of the fusible element into pieces.

From U.S. Pat. No. 800 740 there is known a valve unit which is retained in a fully open position by means of a fusible element, e.g. a fusible nut, and which due to overheating is released to a fully closed position. However, this valve unit can only be used as a cut-off unit in ordinary T-couplings and will find no application as a combined airing and fire protecting valve in straight pipes or channels. Besides, the fully open position of the valve head cannot be altered by adjusting the valve head alone, since the same is secured in position by the fusible nut.

SUMMARY OF THE INVENTION

The object of the present invention is to provide a combined airing and fire protection valve which does not suffer from the above disadvantages. Thus, the present invention has for its object a valve which is designed for easy adjustment to a predetermined air rate, which can only be calibrated and re-calibrated by authorized persons by means of a suitable tool, and which cannot have its characteristics altered in case unintentional turning of the valve head should occur during e.g. washing and cleaning.

The main point of the present invention is that the fusible element in the form of an adjustable nut is disposed on the valve stem in such a manner that the adjustable nut follows the valve stem if the valve head is rotated, so that the valve cannot be undesirably displaced, and that the adjustable nut is disposed on the valve stem between the supporting bracket and the valve head.

The invention will be explained in more detail, reference being had to the accompanying drawings, which diagrammatically illustrate an embodiment of the invention.

DETAILED DESCRIPTION OF THE PREFERRED EMBODIMENT

Figure 1:
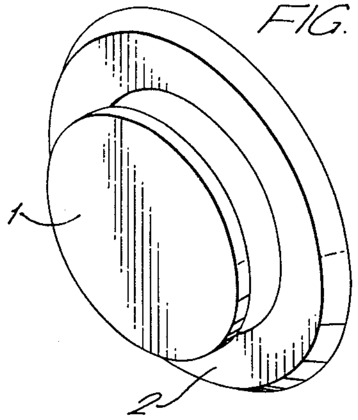
FIG. 1 is an isometric view of the valve as seen from the outside, including valve head and valve seat.
Figure 2:
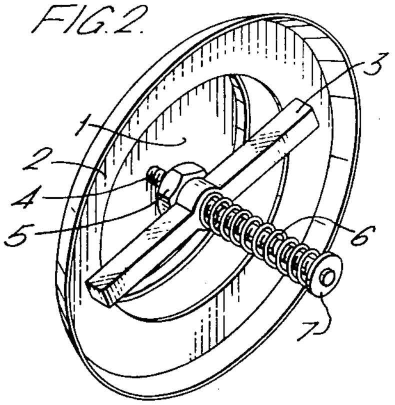
FIG. 2 is an isometric view of the valve as seen from the inside.

As it appears from the drawings the valve is provided with a valve head 1, a valve seat 2 and a valve stem taking the form of an adjusting screw 4. A support bracket 3 extends across the inside of the valve seat 2 and is affixed thereto and is provided with a central aperture supporting and guiding the valve stem 4. Between the support bracket 3 and the inside of the valve head 1 the valve stem 4 is provided with an adjustable nut 5.

The threaded portion of the adjustable nut 5 is made of a fusible material 8. On the opposite side of the support bracket 3 the valve stem 4 is provided with a coiled cut-off spring 6 secured in place by a plate 7 or the like. The fusible material 8 which constitutes the threaded portion of the adjustable nut 5 is so soft that the threads are formed whilst screwing the nut 5 onto the valve stem 4. The adjustable nut 5 will then move so sluggishly that the valve cannot be displaced undesirably. If then, for example one of the cleaning staff or someone else turns the valve head 1, the valve will not become decalibrated by such rotation. The adjustable nut 5 moves so sluggishly that it follows the rotation of the valve stem provided that the nut is not retained by means of a suitable tool.

Figure 3:
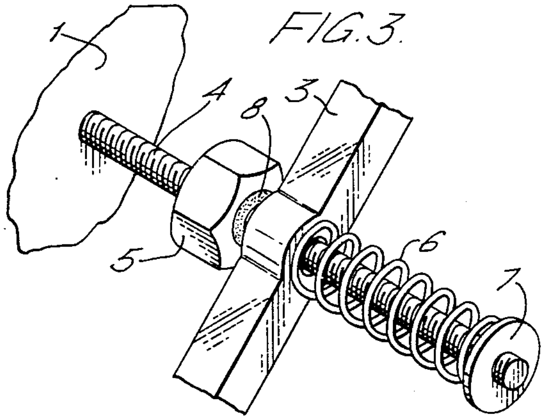
FIGS. 3, 4, 5, 6 show details pertaining to the cut-off functions of the valve.
Figure 5:
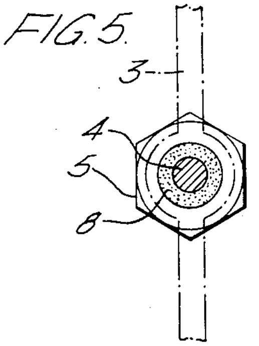
Figure 4:
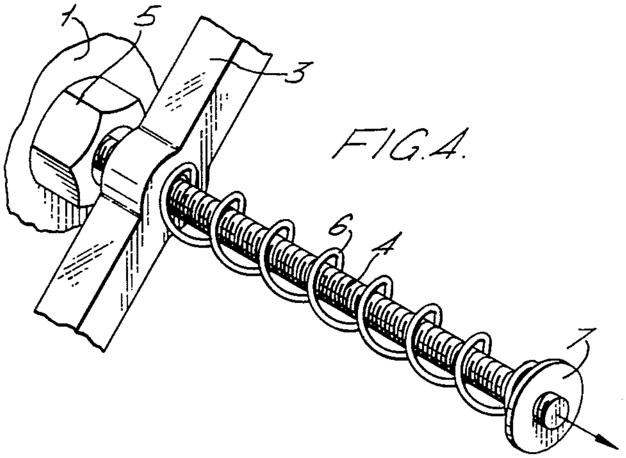
Figure 6:
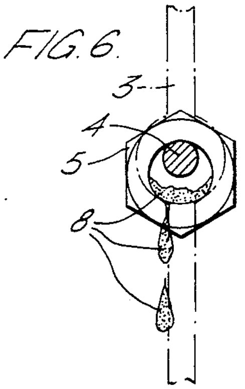

In FIGS. 3 and 5 the valve is calibrated and the fusible material 8 is in place within the adjusting nut 5. From FIGS. 4 and 6 it appears that the fusible material 8 is melted. The cut-off spring 6 has pulled the valve stem 4 through the aperture of the support bracket 3, and the adjusting nut 5 has been pushed up against the inside of the valve head 1. The valve head has then travelled so far that it seals against the valve seat.

As it will now be appreciated from the above a combined airing valve and fire protection valve according to the present invention will possess more advantages than previously known valves. In addition to the special advantage inherent in the saving of a separate valve for one of the functions, the valve according to the invention cannot be maladjusted by unauthorized persons. Further, the valve in itself is very cheap to manufacture and purchase, is very simple to install and provides safe and reliable operation.

In order to increase the friction force between the fuse material of the adjustable nut and the valve stem a paste which does not cure completely should be provided on the threads of the stem.

What I claim is:

1. In a combined adjustable airing valve and fire protection valve comprising a valve head shaped commensurate with a valve seat, a valve stem fixed to said valve head and in the form of an adjusting screw, a fusible structure responsive to temperature taking the form of a threaded portion of an adjustable nut threadably engaged with the valve stem, a support bracket supporting and guiding the valve stem, and a biasing means arranged between the support bracket and a stop plate on the valve stem to bias the valve head towards the valve seat thereby abutting the adjustable nut against the support bracket, the improvement being that the adjustable nut is disposed on the valve stem with sufficient friction such that the adjustable nut rotates with the valve stem if the valve head is rotated, so that the valve head cannot be undesirably displaced, and the adjustable nut is disposed on the valve stem between the supporting bracket and the valve head.

2. The valve is claimed in claim 1, wherein the adjustable nut has the threaded portion thereof made of relatively soft fusible material, which fusible material is responsible for the sufficient friction.

3. The valve as claimed in claim 2 further including a paste which does not cure completely being provided on the threads of the valve stem in order to increase the friction between the fusible material of the adjustable nut and the valve stem.

* * * * *